(12) United States Patent
Chihara et al.

(10) Patent No.: US 11,297,479 B2
(45) Date of Patent: Apr. 5, 2022

(54) PORTABLE WIRELESS DEVICE, COMMUNICATION METHOD, AND SERVER

(71) Applicant: SONY CORPORATION, Tokyo (JP)

(72) Inventors: Shuichi Chihara, Kanagawa (JP);
Shingo Shimada, Kanagawa (JP);
Michiya Mehara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,565

(22) PCT Filed: Oct. 2, 2018

(86) PCT No.: PCT/JP2018/036864
§ 371 (c)(1),
(2) Date: Jul. 1, 2020

(87) PCT Pub. No.: WO2019/138615
PCT Pub. Date: Jul. 18, 2019

(65) Prior Publication Data
US 2021/0076187 A1    Mar. 11, 2021

(30) Foreign Application Priority Data
Jan. 10, 2018 (JP) .............................. JP2018-001625

(51) Int. Cl.
*H04W 4/90* (2018.01)
*H04W 4/024* (2018.01)
*H04L 29/06* (2006.01)

(52) U.S. Cl.
CPC .......... *H04W 4/90* (2018.02); *H04L 63/0861* (2013.01); *H04W 4/024* (2018.02)

(58) Field of Classification Search
None
See application file for complete search history.

(56) References Cited

U.S. PATENT DOCUMENTS

| 10,856,127 B2 * | 12/2020 | Maier ............... G08B 21/182 |
| 2016/0224779 A1 | 8/2016 | Kitane |
| 2017/0186307 A1 | 6/2017 | Kim |

FOREIGN PATENT DOCUMENTS

| CN | 106463041 A | 2/2017 |
| EP | 3089062 A1 | 11/2016 |
| JP | 2006-216076 A | 8/2006 |
| JP | 2008-217756 A | 9/2008 |
| JP | 2009-230161 A | 10/2009 |
| JP | 2015-121910 A | 7/2015 |
| JP | 2015-201803 A | 11/2015 |

(Continued)

OTHER PUBLICATIONS

Yoichi Yamazaki, "Sony Enters with Unique Technology—LPWA Forefront", Nikkei Network, Oct. 2017, pp. 54-59.

(Continued)

*Primary Examiner* — Adolf Dsouza
(74) *Attorney, Agent, or Firm* — Chip Law Group

(57) ABSTRACT

A portable wireless device includes a wireless communication unit, a position information acquisition unit, an operation unit, and a control unit, in which a rescue request and state information are generated by operation of the operation unit, and the generated information is transmitted from the wireless communication unit together with position information acquired by a position acquisition unit.

12 Claims, 16 Drawing Sheets

(56) References Cited

FOREIGN PATENT DOCUMENTS

| JP | 2016-134815 A | 7/2016 |
|---|---|---|
| JP | 2017-038205 A | 2/2017 |
| KR | 10-2015-0115405 A | 10/2015 |
| WO | 2007/097044 A1 | 8/2007 |
| WO | 2015/098384 A1 | 7/2015 |
| WO | 2015/152475 A1 | 10/2015 |
| WO | 2017/026111 A1 | 2/2017 |

OTHER PUBLICATIONS

Horikoshi Isao, "Use of LoRaWAN to Reduce Mountainous Distress Accident—Clear of Communication Problem with Third Try", Nikkei Communications, Monthly Report, No. 635, Dec. 2016, pp. 40-41.

"Use of LoRaWAN to Reduce Mountainous Distress Accident Clear of Communication Problem with Third Try", Nlikkei Communications, ISSN 0910-7215, Jul. 2017, pp. 39-41.

Yamazaki, et al. "Sony Enters with Unique Technology LPWA Forefront", Nikkei Business Publications, ISSN 1345-482X, Sep. 2017, pp. 54-59.

Horikoshi, et al., "Use of LoRaWAN to Reduce Mountainous Distress Accident Clear of Communication Problem with Third Try", Nlikkei Communications, ISSN 0910-7215, Jul. 2017, pp. 39-41.

International Search Report and Written Opinion of PCT Application No. PCT/JP2018/036864, dated Nov. 27, 2018, 10 pages of ISRWO.

\* cited by examiner

FIG. 4A

INFORMATION REGISTERED
AT TIME OF APPLYING FOR SERVICE

- NAME
- GENDER
- AGE
- BLOOD TYPE
- ADDRESS
- PHONE NUMBER
- EMAIL ADDRESS
- TERMINAL ID TO BE ASSOCIATED
  (IN CASE OF LINKING TWO TERMINALS)
- EMERGENCY CONTACT INFORMATION
  (CONTACT INFORMATION FOR
  NOTIFICATION AT TIME OF SOS)
    - NAME
    - ADDRESS
    - RELATIONSHIP
    - PHONE NUMBER
    - EMAIL ADDRESS

FIG. 4B

INFORMATION REGISTERED IN ADVANCE
AT TIME OF MOUNTAIN CLIMBING

- DATE
- NAME OF MOUNTAIN
- ROUTE (SELECTION BY Drop down OR THE LIKE)
- NUMBER OF PARTY MEMBERS
- NAME OF PARTY MEMBERS
- ID IF MEMBER SUBSCRIBES SERVICE
- GEAR INFORMATION (INCLUDING FOOD)
- PARTY ORGANIZATION INFORMATION
    - ORGANIZATION NAME
    - PHONE NUMBER
    - EMAIL ADDRESS

FIG. 5A

| TERMINAL ID | 1234567890 | | | | |
|---|---|---|---|---|---|
| TIME | LATITUDE | LONGITUDE | ALTITUDE | status | |
| 17/10/12 06:15:00 | XX.XXXX | XXX.XXX | XXXX.X | start | |
| 17/10/12 06:30:00 | XX.XXXX | XXX.XXX | XXXX.X | | |
| 17/10/12 06:45:00 | XX.XXXX | XXX.XXX | XXXX.X | | |
| 17/10/12 07:00:00 | XX.XXXX | XXX.XXX | XXXX.X | | |
| ⋮ | ⋮ | ⋮ | ⋮ | ⋮ | |
| 17/10/12 09:45:00 | XX.XXXX | XXX.XXX | XXXX.X | | |
| 17/10/12 10:00:00 | XX.XXXX | XXX.XXX | XXXX.X | | |
| 17/10/12 10:15:00 | XX.XXXX | XXX.XXX | XXXX.X | SOS | INJURY |
| 17/10/12 10:16:00 | XX.XXXX | XXX.XXX | XXXX.X | SOS | INJURY |
| 17/10/12 10:17:00 | XX.XXXX | XXX.XXX | XXXX.X | SOS | INJURY |
| 17/10/12 10:18:00 | XX.XXXX | XXX.XXX | XXXX.X | SOS | INJURY |
| 17/10/12 10:19:00 | XX.XXXX | XXX.XXX | XXXX.X | SOS | INJURY |
| 17/10/12 10:20:00 | XX.XXXX | XXX.XXX | XXXX.X | SOS | INJURY |

FIG. 5B

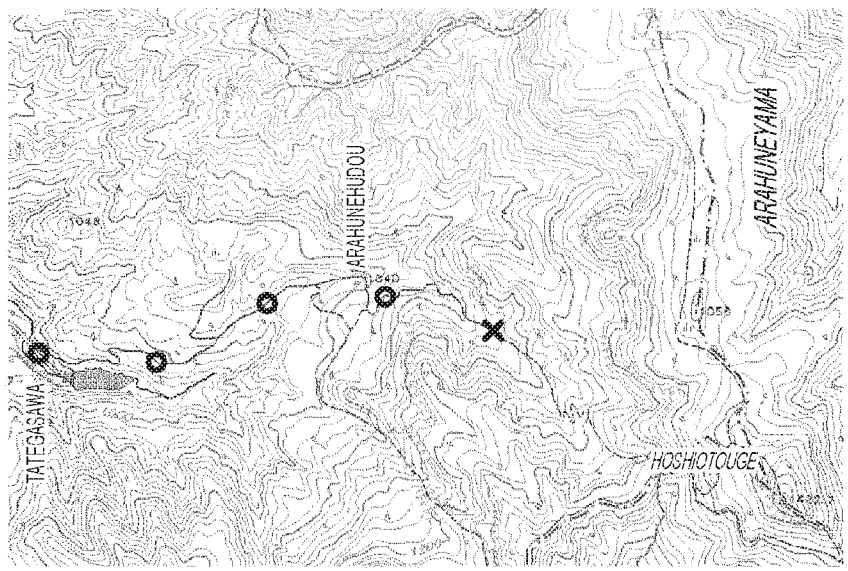

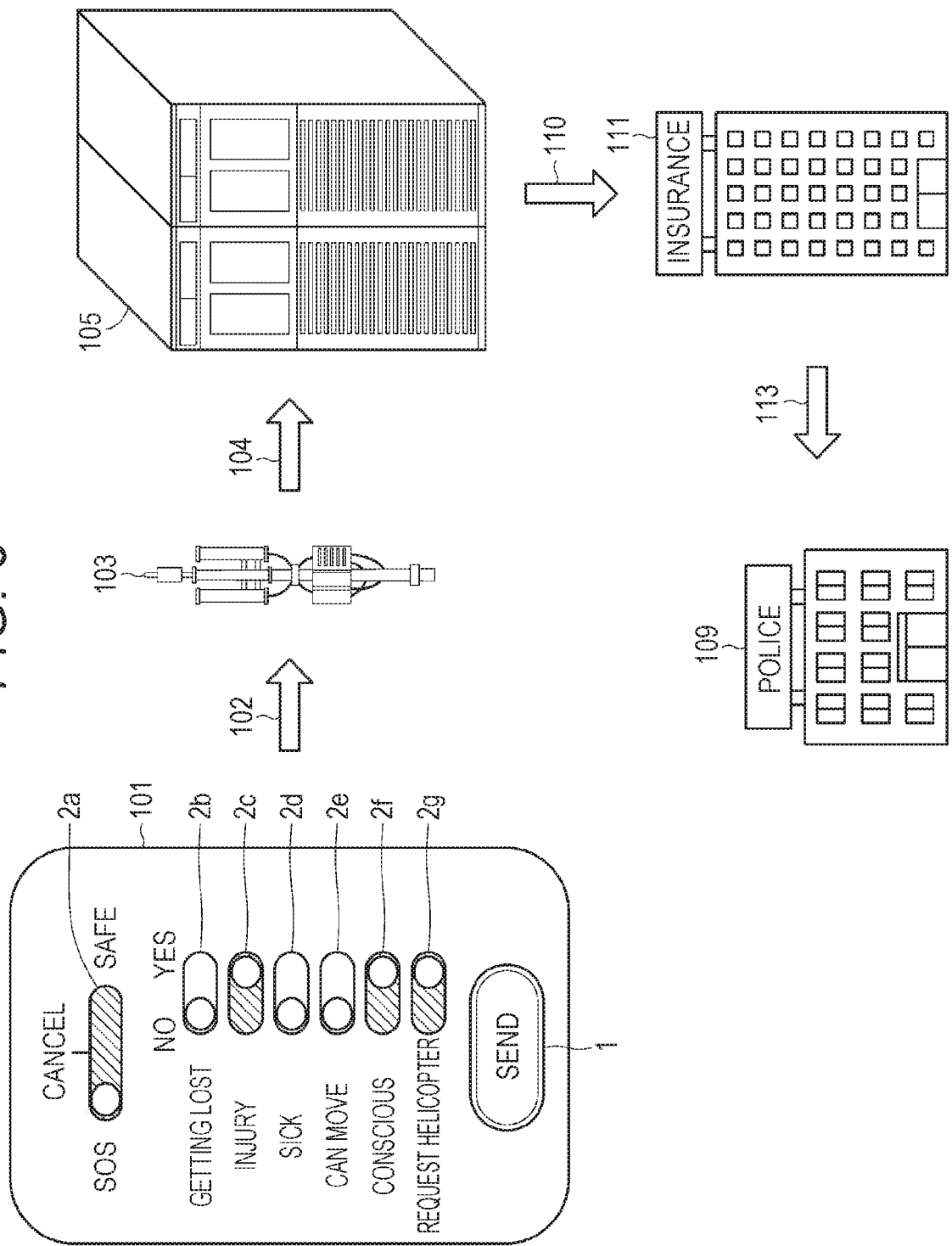

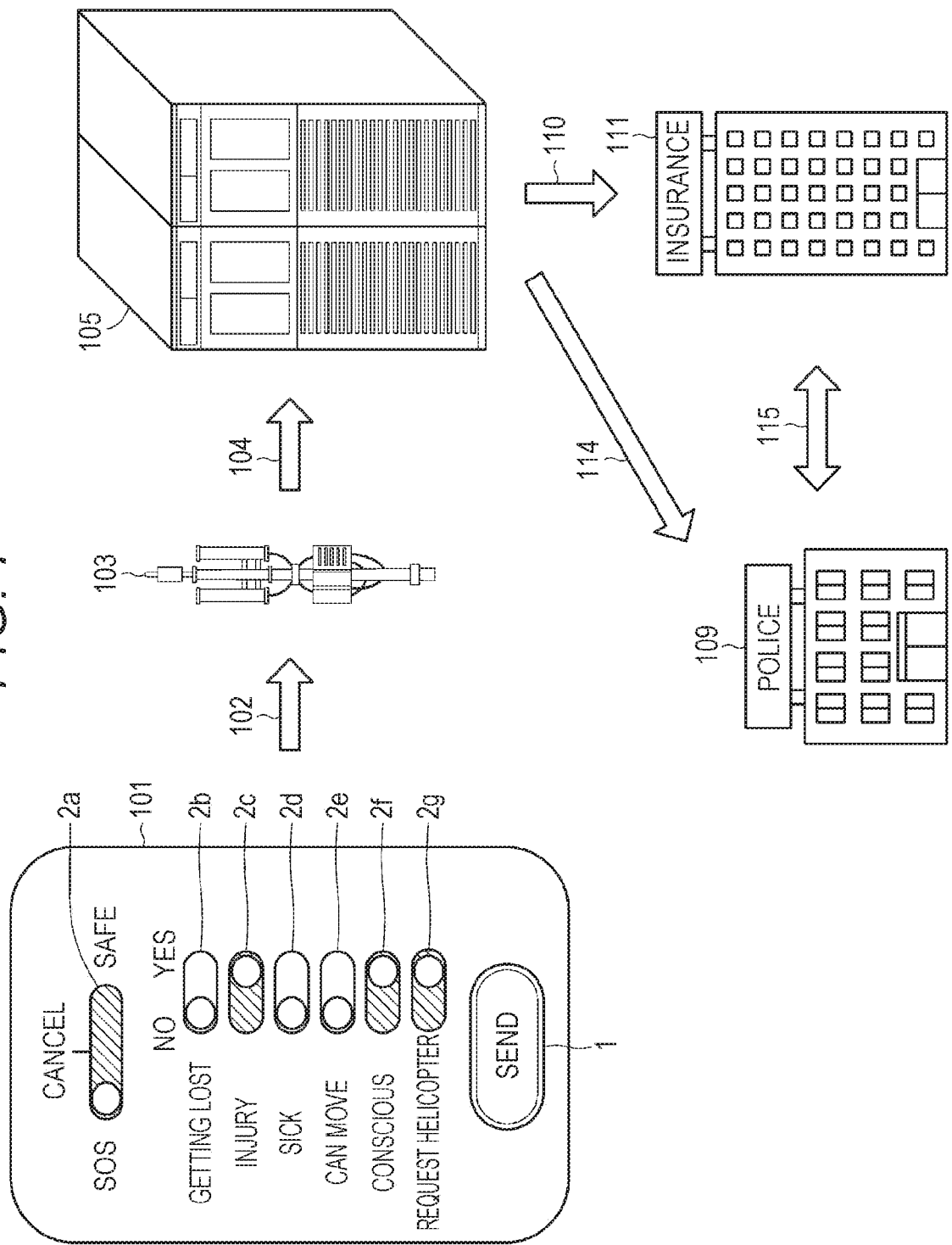

PORTABLE WIRELESS DEVICE, COMMUNICATION METHOD, AND SERVER

CROSS REFERENCE TO RELATED APPLICATIONS

This application is a U.S. National Phase of International Patent Application No. PCT/JP2018/036864 filed on Oct. 2, 2018, which claims priority benefit of Japanese Patent Application No. JP 2018-001625 filed in the Japan Patent Office on Jan. 10, 2018. Each of the above-referenced applications is hereby incorporated herein by reference in its entirety.

TECHNICAL FIELD

The present technology relates to a portable wireless device, a communication method, and a server used for requesting rescue.

BACKGROUND ART

Accidents during mountain climbing are increasing year by year. It is desirable to be able to report a correct rescue request to a related organization in terms of prompt rescue of a victim. A mobile phone can be considered as a reporting means. However, in a zone where accidents occur, a mobile phone call may not be possible, and other communication means is used. For example, Patent Document 1 discloses a terminal device that transmits a rescue request mail via a relay satellite.

That is, a portable terminal device is disclosed that transmits a rescue request mail attached with a rescue request file indicating a rescue request, receives a reply mail to the rescue request mail, and outputs a voice message when the rescue information mail is received. When a rescue button is pressed in a case of requesting rescue, a plurality of email addresses is set as destinations, a rescue request mail attached with a rescue request file is generated, and the generated rescue request mail is transmitted. The rescue request mail is transmitted by a one-touch operation. The rescue request mail includes a rescue signal and an accident position of the requested person.

CITATION LIST

Patent Document

Patent Document 1: Japanese Patent Application Laid-Open No. 2015-201803

SUMMARY OF THE INVENTION

Problems to be Solved by the Invention

The device disclosed in Patent Document 1 can transmit a rescue request and position information, but cannot transmit a situation such as the current degree of injuries of a victim and the like. Accordingly, there has been a problem that the side receiving the rescue request cannot perform quick and correct response.

Therefore, the present technology provides a portable wireless device, a communication method, and a server that can transmit a situation together with a rescue request and position information to a server and appropriately perform rescue for an accident.

Solutions to Problems

The present technology is a portable wireless device including a wireless communication unit, a position information acquisition unit, an operation unit, and a control unit, in which a rescue request and state information are generated by operation of the operation unit, and the generated information is transmitted from the wireless communication unit together with position information acquired by a position acquisition unit.

Furthermore, the present technology is a communication method including generating a rescue request and state information by operation of an operation unit, and transmitting generated information together with position information from a wireless communication unit.

Moreover, the present technology is a server that manages registration information of a plurality of portable wireless devices, and holds state information and position information received for each portable wireless device in time series.

Effects of the Invention

According to at least one embodiment, a situation of a victim can be transmitted, so that rescue operation can be appropriately performed. Note that the effects described herein are not necessarily limited, and any of the effects described in the present technology or different effects from those may be applied.

BRIEF DESCRIPTION OF DRAWINGS

FIGS. 4A and 4B are schematic line diagrams illustrating an example of information registered in a server.

FIGS. 5A and 5B are schematic line diagrams illustrating an example of data stored in a server and an example of data display.

FIG. 6 is a block diagram illustrating another example of a wireless terminal and a rescue request system to which the present technology is applied.

FIG. 7 is a block diagram illustrating still another example of a wireless terminal and a rescue request system to which the present technology is applied.

MODE FOR CARRYING OUT THE INVENTION

Hereinafter, embodiments and the like of the present technology will be described with reference to the drawings. Note that the description will be given in the following order.

1. First Embodiment

<2. Modification>
The embodiment and the like described below are preferred specific examples of the present technology, and the contents of the present technology are not limited to these embodiments and the like.

1. First Embodiment

Figure 1:
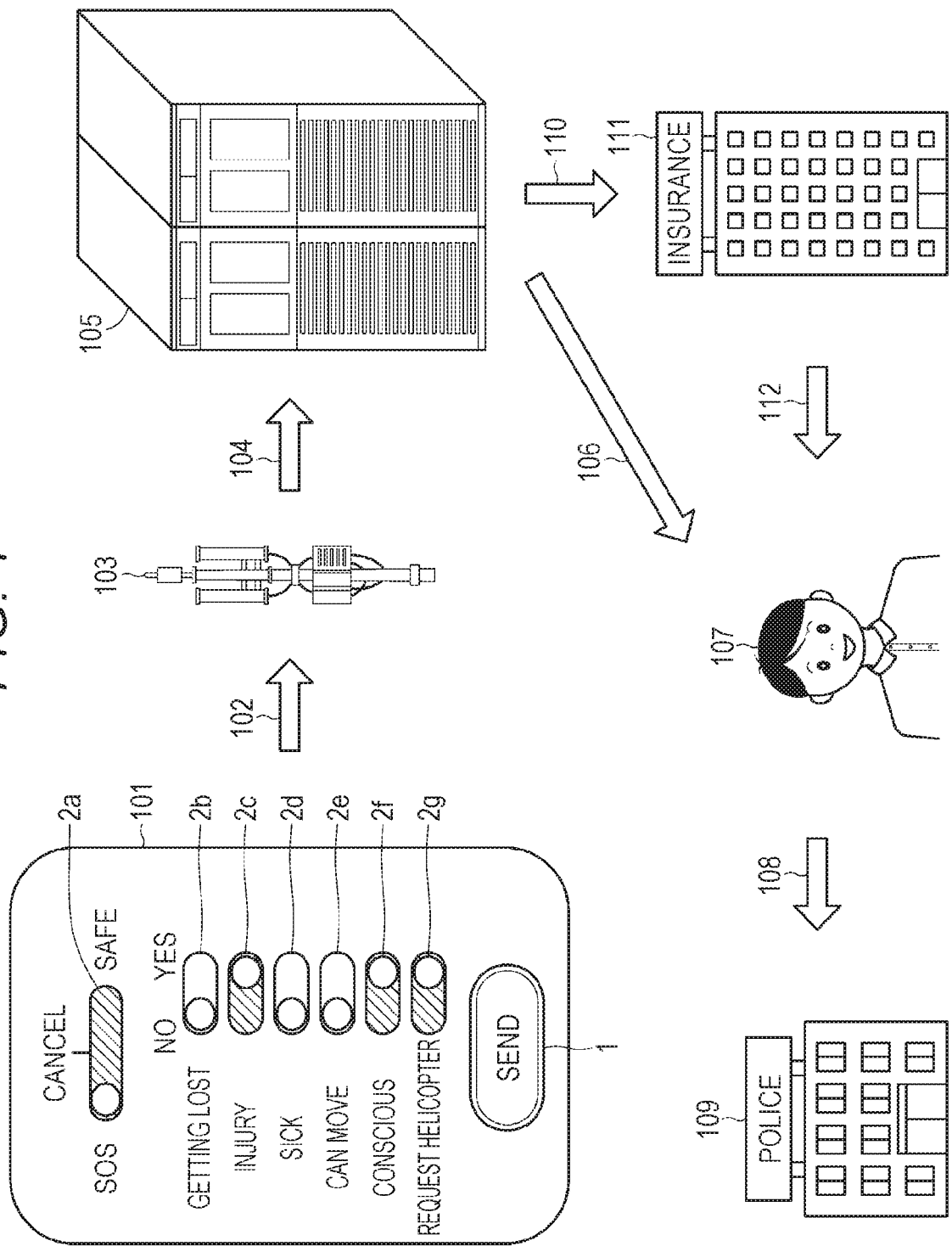
FIG. 1 is a block diagram illustrating an example of a wireless terminal and a rescue request system to which the present technology is applied.

FIG. 1 illustrates an example of a rescue request system including a portable wireless device (hereinafter, simply referred to as a wireless terminal) according to the present technology. A wireless terminal 101 includes a send button 1 and operation units 2a, 2b, . . . , 2g (in a case where these operation units do not need to be particularly distinguished, they are simply referred to as an operation unit 2).

When predetermined operation, for example, pressing the send button 1 long time is performed, the power of the wireless terminal 101 is turned on, and the wireless terminal 101 starts transmitting data at predetermined time intervals. Note that a power switch may be provided separately from the send button 1. The operation unit 2 has, for example, a configuration of a slide switch. The position selected by slide operation can be clearly understood by the brightness, the color difference, and the like. The slide switch is an example, and a push button switch, a rotary switch, or the like may be used. Furthermore, although the state display is printed near the switch, a display unit such as a liquid crystal display (LCD) may be provided separately from the switch.

The operation unit 2 has a configuration in which a switch is provided for each notification item in order to make notification of the state of the victim. Each operation unit 2 transmits a rescue request and data indicating the current situation of the person holding the wireless terminal 101 (information indicating a state is referred to as a status) as described below. Note that one or more people in the same climbing party may carry the wireless terminals 101, or a person near the victim may carry the wireless terminal 101, and these people transmit the status.

Operation unit 2a: Selection is made for a rescue request (denoted as SOS in the drawing), a rescue request cancellation, and a safe state.

Operation unit 2b: Selection is made on whether or not the person is getting lost.

Operation unit 2c: Selection is made on whether or not the person is injured.

Operation unit 2d: Selection is made on whether or not the person is sick.

Operation unit 2e: Selection is made on whether or not the person can move.

Operation unit 2f: Selection is made on whether or not the person is conscious.

Operation unit 2g: Selection is made on whether rescue by helicopter is necessary.

The status is an item such as a rescue request, cancel thereof, and safe that can be designated by operation of the above-described operation units 2a to 2g. The status selected by the operation units 2b to 2g is a qualifier of the rescue request, and the cancel and safe selected by the operation unit 2a are statuses that do not have a relationship of the rescue request and the qualifier. That is, when cancel is selected, operation of continuously transmitting for a certain period a cancel signal for canceling a rescue request once is performed, and when safe is selected, operation of continuously transmitting for a certain period a signal indicating that the person is currently safe is performed. In these operations, it is not necessary to add status information about the degree of injury or whether or not the person is sick. Even in a case where the person gets tired without being sick or injured and gets downhill later than expected, his/her family may make a search request worried about the delay. At this time, it costs a lot of money. This is because the means of communication is limited in mountainous areas. There have been quite a few climbers who want to show their safety in a place where a mobile phone is not accessible. Therefore, a function that enables transmission of only the information indicating that the person is safe at predetermined intervals is useful.

Moreover, as the status, items other than those described above are possible. That is, "getting lost", "bleeding", "person himself/herself or member in same party (who pressed the rescue request)", "number of people" (number of victims)", "existence of food (water)", or the like is possible.

Figure 2:
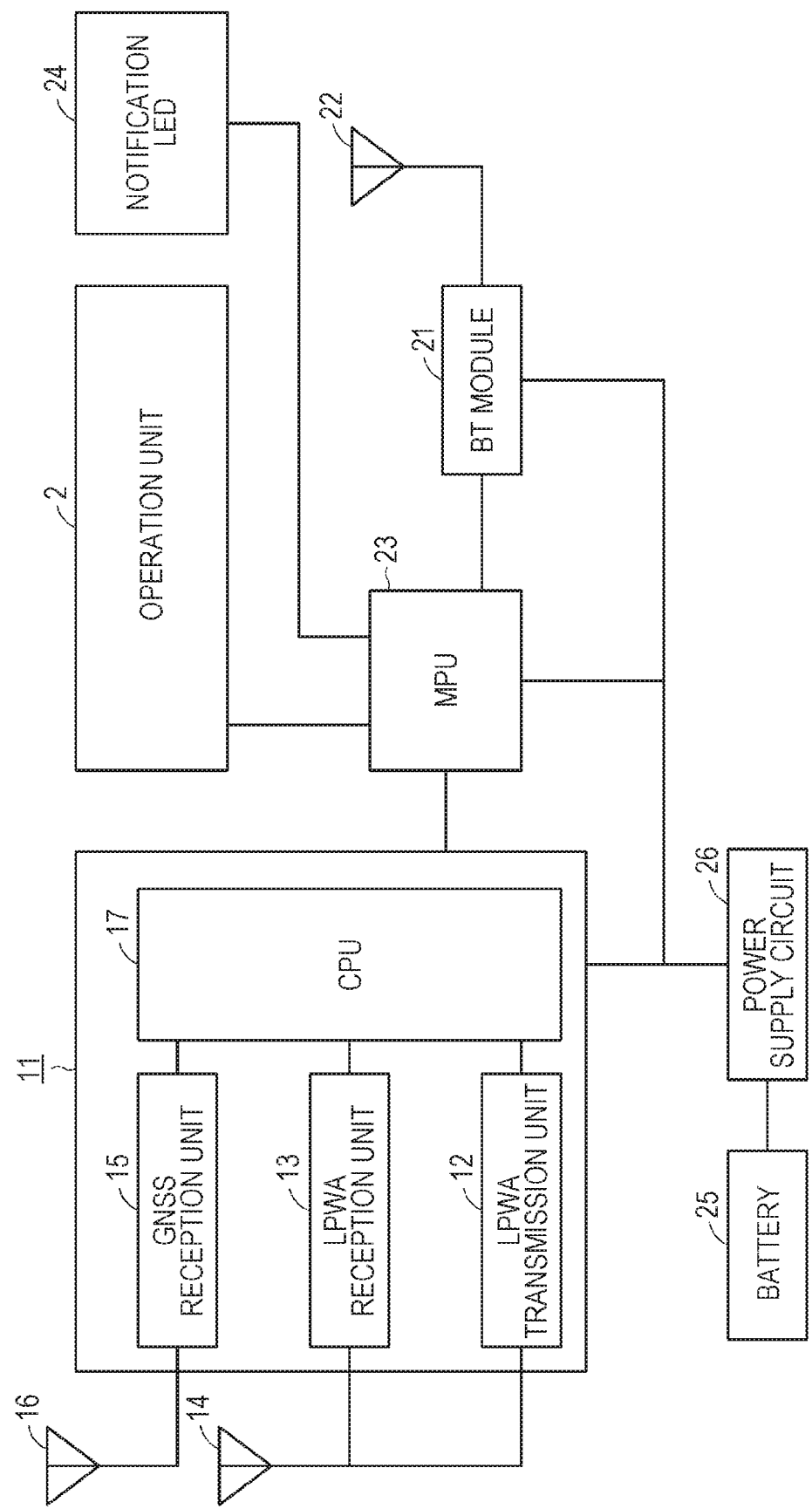
FIG. 2 is a block diagram of an example of a configuration of the wireless terminal.

As illustrated in FIG. 2, the wireless terminal 101 has a wireless module, for example, a low power wide area (LPWA) module 11. The LPWA consumes very little power and can deliver radio waves to distant data collection base stations (gateway devices). This is a preferred communication method to be used in a case where, even though a data size is small, communication is performed over a wide range and frequently at a distance of km. The LPWAs can be broadly divided into "cellular LPWAs" that require a license and "non-cellular LPWAs" that do not require a license.

The license-required "cellular LPWA" is an LPWA standard in the licensed frequency band that is being worked on by the third generation partnership project (3GPP) that promotes the standardization of LTE and 5G. An LPWA network is constructed by the technology of mobile phone communication in the frequency band for which the mobile phone carrier is licensed. The license-not-required "non-cellular LPWA" is an LPWA standard in which the IEEE and each alliance use the industry science medical (ISM) (frequency allocated for general using in the fields of industry, science, and medical) band. An LPWA network is constructed using the ISM band that does not require a license. As the LPWA, a plurality of methods is known as described below, but any of the methods may be used. A method having long reaching distance (about several tens km to 100 km) is preferable. Note that, as a communication method, a method other than the LPWA or a method of a different wavelength may be used. Moreover, in a case of performing bidirectional communication, a wavelength different from that of the LPWA may be used as a received wave.

The main methods of the LPWA include SIGFOX, LoRaWAN (LoRa), NB-IoT, GreenOFDM, DASH7, RPMA, Wi-SUN, LTE-MTC, NB-Fi Protocol, ELTRES (registered trademark), and the like.

The LPWA module 11 includes an LPWA transmission unit 12, an LPWA reception unit 13, a global navigation satellite system (GNSS) reception unit 15, and a central processing unit (CPU) 17. In a case where it is not necessary to perform bidirectional communication, the LPWA reception unit 13 may not be provided. The GNSS is a general term for satellite positioning systems such as Global Positioning System or Global Positioning Satellite (GPS), Global Navigation Satellite System (GLONASS), Galileo, or Quasi-Zenith Satellite System (QZSS). An LPWA antenna 14 and a GNSS antenna 16 are provided. The CPU 17 is provided for controlling the LPWA module 11.

The wireless terminal 101 further includes a Bluetooth (registered trademark) (hereinafter, abbreviated as BT) module 21 and a BT antenna 22. The BT is used when linking with other devices. A micro processing unit (MPU) 23 is provided to control the entire wireless terminal 101. An operation signal from the operation unit 2 is supplied to the MPU 23. The operation unit 2 is a switch for turning on/off the power, transmitting, and making notification of the state as described above. A notification light emitting diode (LED) is provided to display the operation state of the wireless terminal 101 and the like. Moreover, a battery 25 and a power supply circuit 26 are provided, and power is supplied to each circuit unit.

Figure 3:
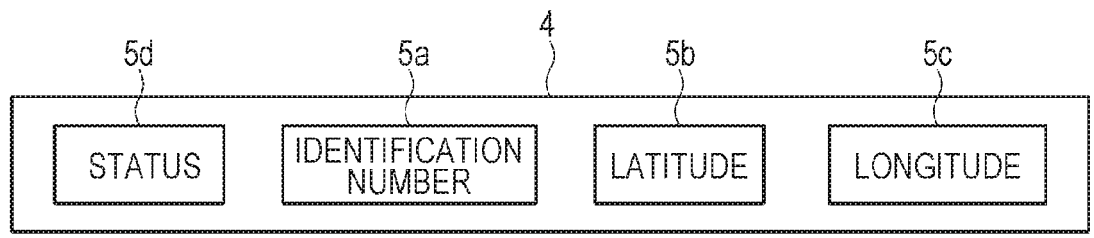
FIG. 3 is a schematic line diagram illustrating an example of a configuration of transmission data.

As illustrated in FIG. 3, the wireless terminal 101 transmits transmission data including an identification number 5a, latitude information 5b, longitude information 5c, and a status 5d of the wireless terminal 101 as one packet. Normal transmission is performed, for example, once every 15 minutes, and is performed until the power is turned off. Emergency communication for making a rescue request is performed for a shorter time, for example, once a minute, and is continued for one week.

Returning to FIG. 1, transmission data from the wireless terminal 101 is transmitted to a gateway 103 via a wireless path 102. The wireless path 102 is an LPWA wireless path. The gateway 103 has a function as a relay base station and a function of protocol conversion. The gateway 103 is installed within a reaching distance from the wireless terminal 101. For example, the gateway 103 is provided on the top of a mountain or at the foot of a mountain with a good view.

Data is transmitted from the gateway 103 to a server (for example, a cloud server) 105 via a path 104. For the path 104, any of a public line, a dedicated line, a wireless line, a wired line, and the like can be used, and the path 104 may be via a plurality of lines. For example, the gateway 103 and the server 105 are connected via the Internet. The data transmitted from the wireless terminal 101 is stored in the server 105 via the gateway 103. Furthermore, the server 105 stores in advance information in which identification information of the wireless terminal 101 (referred to as terminal ID as appropriate) and a person (user) are associated with each other. Therefore, it is possible to specify a person from the terminal ID from the wireless terminal 101.

FIG. 4A illustrates an example of user information registered when applying for a service. For example, user information is registered when the wireless terminal 101 is purchased or the wireless terminal 101 is borrowed. "Name", "gender", "age", "blood type", "address", "phone number", "email address", "terminal ID to be associated (in a case of linking two or more wireless terminals)", "emergency contact information (contact information for notification of rescue request)" are registered. Moreover, "name", "address", "relationship", "phone number", and "email address" of the contact information are registered.

In order to smoothly perform rescue operation for an accident, as similar to the conventional mountain climbing report, information illustrated in FIG. 4B is registered in the server 105 at the time of mountain climbing. These pieces of information include date, name of mountain, route, number of party members, name of party members, terminal ID if the member subscribes a service, gear information (including food), and party organization information (organization name, phone number, email address)). The information illustrated in FIG. 4B is registered in the server 105 at the start of mountain climbing or in advance using a smartphone, a PC, or the like.

FIG. 5A illustrates an example of information transmitted from the wireless terminal 101 and stored in the server 105 in the rescue request system illustrated in FIG. 1. FIG. 5A illustrates an example of information transmitted from a certain wireless terminal 101 (specified by a terminal ID).

When the power of the wireless terminal 101 is turned on at the start of mountain climbing, data is transmitted every 15 minutes, and the server 105 sequentially stores time, position information (longitude, latitude, and altitude), and status. When an accident occurs at a certain time and a rescue request operation is performed on the wireless terminal 101, the status of the server becomes "SOS", and "injury" is displayed in the status due to injury. Thereafter, data in this state is received every minute.

FIG. 5B is a display example in a case where information from the wireless terminal 101 is displayed on a map. On a route of a climber having the wireless terminal 101, the position where data is transmitted is indicated by o, and the point where the SOS is sent is indicated by X. The server 105 can display such a map display by designating a terminal ID. Moreover, the server 105 monitors data from the wireless terminal 101, and detects that a rescue request has been sent.

When the server 105 receives the rescue request, an emergency contact is made from the server 105 to a registrant 107 registered in advance via the path 106. For example, emergency contact is made by telephone, e-mail, or the like. In this case, notification is made including personal information such as the name of the person who meets with the accident, the date and time of the accident, the place of the accident, the degree of injury, and the like. The registrant 107 is a family member, an acquaintance, or the like. The registrant 107 who has received the emergency contact requests rescue to a rescue agency 109 via the path 108. The rescue agency 109 is a police, fire department, or the like. Usually, a rescue request is made by telephone or the like. The rescue agency 109 receiving the rescue request takes necessary measures.

Moreover, the server 105 that has received the rescue request notifies an insurance company 111 via the path 110 of the occurrence of the accident. The insurance company 111 is a mountain insurance company to which the person who meets with the accident subscribes. The insurance company 111 pays the registrant 107 the expenses incurred in the rescue operation according to the contents of the contract (indicated by the path 112).

With reference to FIG. 6, another example of the rescue request system including the wireless terminal 101 according to the present technology will be described. In this system, the server 105 that has received the rescue request notifies the insurance company 111 that the rescue request has been sent through the path 110. The insurance company 111 makes a rescue request directly to the rescue agency 109 via a path 113. Rescue operation can be started even in a case where the registrants such as family members cannot be contacted.

With reference to FIG. 7, still another example of the rescue request system including the wireless terminal 101 according to the present technology will be described. When the server 105 receives the rescue request notification, the server 105 automatically sends a rescue request to the rescue agency 109 via a path 114. Furthermore, the server 105 notifies the insurance company 111 that the rescue agency has been notified and that the rescue agency 109 has been notified. The communication with the police after the report is carried out by the insurance company 111 via a path 115. As with other systems, rescue operation can be started even in a case where the registrants such as family members cannot be contacted.

Moreover, it is desirable that the support of family members and related persons be provided. For example, a registered person such as a family member is informed that a rescue request has been made. Even in a case where the server 105 notifies the registrant that a rescue request has been made, the insurance company 111 will also contact the registrant to prevent oversight. Furthermore, the insurance company 111 supports the hearing from the police at the time of the report or after the report because it is possible that the user is upset and cannot take an appropriate action, for example. Moreover, the insurance company 111 checks whether it is missent. For example, the insurance company 111 contacts the victim. If the mobile phone is connected, the insurance company 111 checks the state. If a party is registered, the insurance company 111 checks the sending of a rescue request from the party or contacts the party.

In the rescue request system described above, a large amount of data related to the rescue request is stored in the server 105. This accumulated data can be used effectively. An example of a service utilizing the data will be described below.

Examples of services that can be provided before climbing

The climbing route can be checked in advance from the member's climbing history. The climbing route can be checked on a map on a website or an application.

The climbing speed can be calculated (the climbing level is calculated) from the history of climbing of himself/herself and the result and member data are compared to each other to predict the arrival and passing times. The estimated passing time is displayed for each point on the trail on the map. Thereby, an appropriate mountain climbing plan can be made.

Danger points and caution points can be grasped. For example, points where an accident occurred in the past are displayed on the map. Knowing the danger points in advance makes it easier to avoid accidents.

Examples of services that can be provided during mountain climbing

Mountain entry management is possible. This can be a climbing notice. Information can be shared with mountain managers. The congestion of mountain trails and mountain huts can be known. If a smartphone or the like can be used, it is possible to display the position information of the climber who is currently climbing and the information of the mountain hut on the map. If an accident has occurred, that information can be obtained.

Examples of services that insurance companies can use

Based on information on the accident, the risk of the mountain is determined, and therefore, the insurance premium is changed. The insurance premium is increased or options are set for a dangerous mountain or dangerous time.

The use of the wireless terminal 101 is not limited to the case where the wireless terminal 101 is used alone, and the wireless terminal 101 can operate in cooperation with another device. For example, the wireless terminal 101 is connected to another wearable device by communication using the BT module 21. As the wearable device, a wristband type device, a smart watch, a mountain climbing clock, smart glasses, and the like can be used. In particular, a wearable device that can acquire biological information is preferable. That is, biological information or the like obtained from the wearable device is added to the notification transmitted from wireless terminal 101. The state (danger of life) of the victim can be estimated from this biological information, and the rescue side can be prepared.

Figure 8:
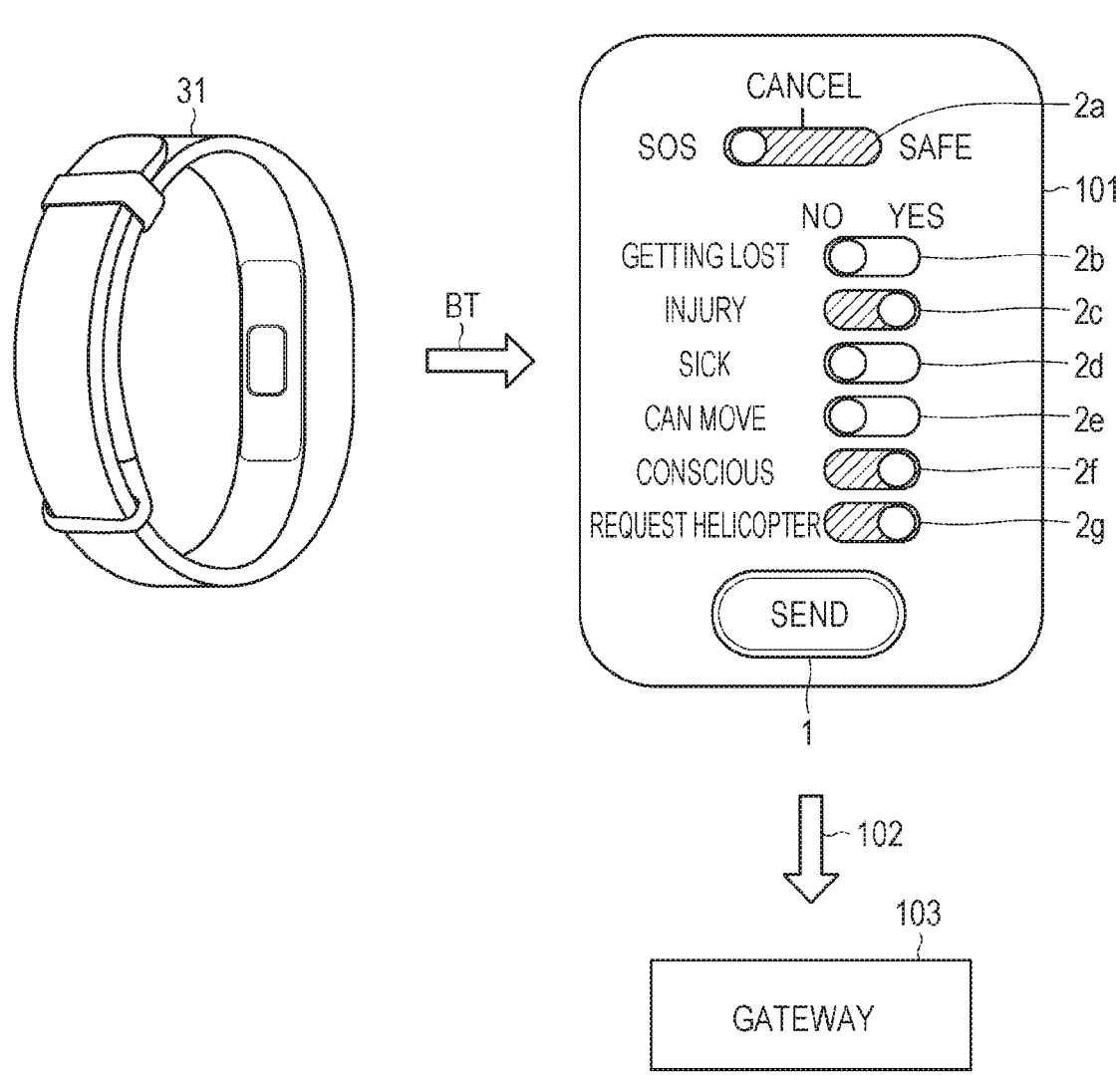
FIG. 8 is a schematic line diagram used to explain cooperation between a wireless terminal and a wristband type device.

FIG. 8 illustrates an example in which a wristband type device 31 is used as a wearable device. The wristband type device 31 and the wireless terminal 101 are connected by, for example, the BT. The wristband type device 31 has a function as an activity meter. For example, heart rate, blood pressure, blood oxygen concentration, and body temperature are obtained as biological information. In another example of the wearable device, temperature and altitude information can be obtained. These pieces of biological information are included in the data transmitted by the wireless terminal 101.

The wireless terminal 101 preferably has a function of preventing an unintentional rescue request due to an operation error, a mischief, an unexpected depression, or the like. Hereinafter, an example of a configuration or a method for realizing the functions of preventing spoofing and malfunction will be described.

Figure 9A:
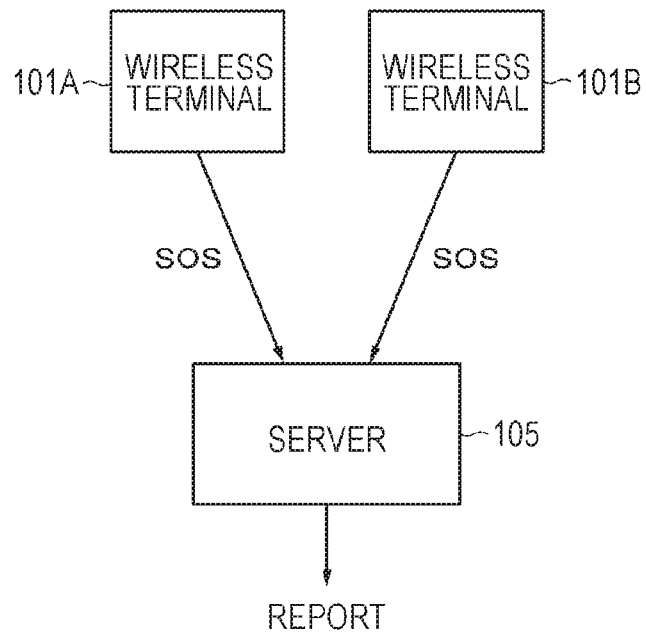
FIGS. 9A and 9B are schematic line diagrams used to explain spoofing prevention and malfunction prevention using two wireless terminals.
Figure 9B:
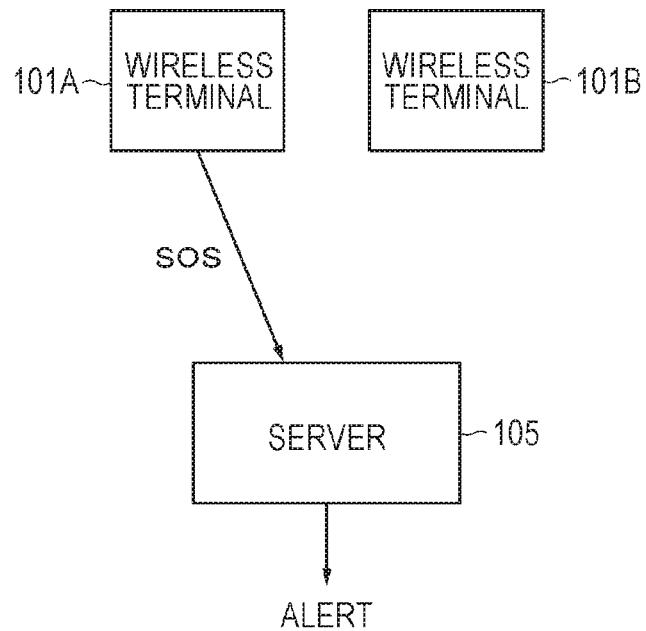

A first method is linking two wireless terminals 101A and 101B. As illustrated in FIG. 9A, in a case where rescue requests are simultaneously sent from sufficiently close places from wireless terminals 101A and 101B having different terminal IDs, it is determined that the request is a real rescue request. As illustrated in FIG. 9B, since the rescue request sent from only one wireless terminal 101A may be spoofed, the degree of urgency is reduced and only family members are notified.

Figure 10:
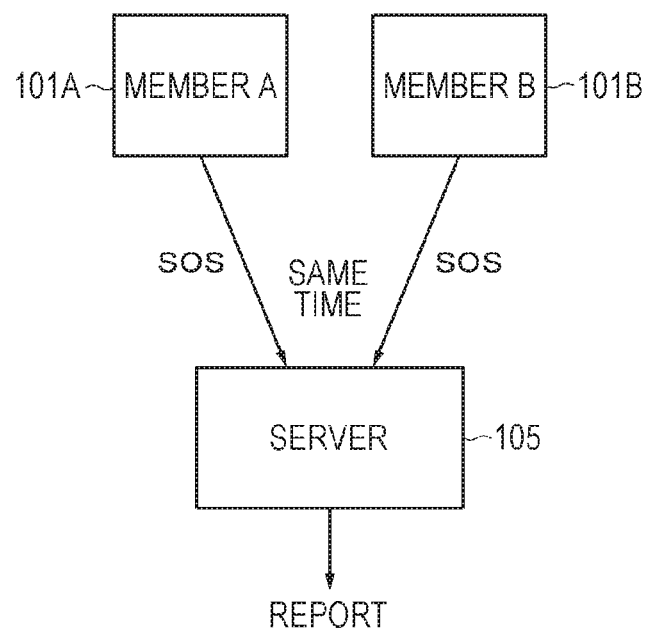
FIG. 10 is a schematic line diagram used to explain spoofing prevention and malfunction prevention using two wireless terminals in a case of a party of multiple persons.

In a case of a party of a plurality of persons, the terminal ID of the party is registered in the server 105 in advance. As illustrated in FIG. 10, in a case where sending is performed by two of the wireless terminals 101A and 101B at substantially the same place within a specific time, it is determined that the request is a real rescue request.

Figure 11A:
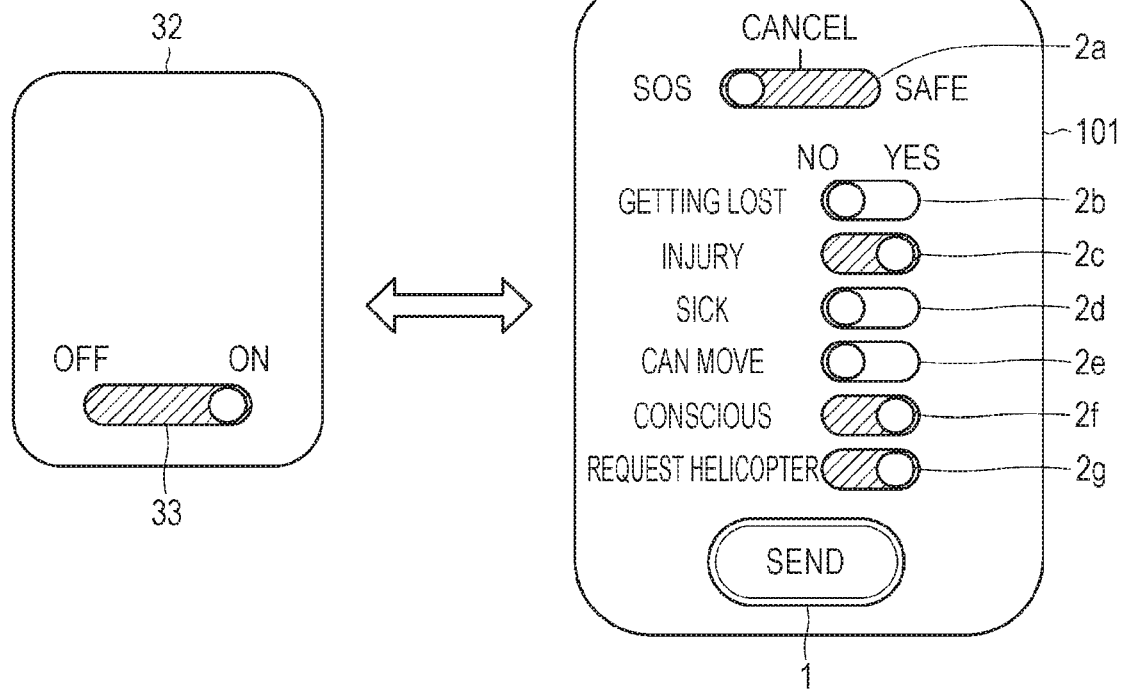
FIGS. 11A and 11B are schematic diagrams used to explain spoofing prevention and malfunction prevention using a malfunction prevention tag.
Figure 11B:
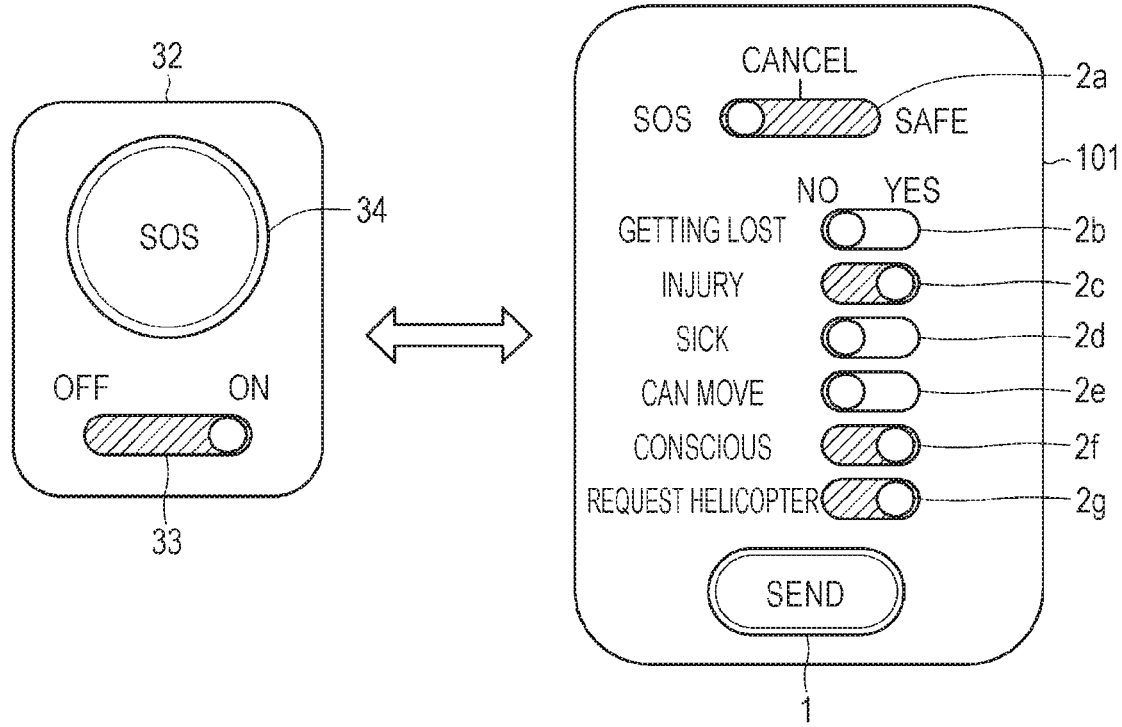

A second method is using a malfunction prevention tag. The malfunction prevention tag is worn on a belt or the like. As illustrated in FIG. 11A, the malfunction prevention tag 32 is provided with a start switch 33. The wireless terminal 101 and the malfunction prevention tag 32 are BT-connected. If the wireless terminal 101 and the malfunction prevention tag 32 are not within a certain distance, the wireless terminal 101 is disabled to send a rescue request. Furthermore, as illustrated in FIG. 11B, the wireless terminal 101 is enabled to send a rescue request only when a rescue request switch 34 is provided on the malfunction prevention tag, and unless both the start switch 33 and the rescue request switch 34 are turned ON. Note that a smartphone may be used instead of the malfunction prevention tag 32 so that a rescue request can be transmitted only when a registered smartphone is nearby.

Figure 12A:
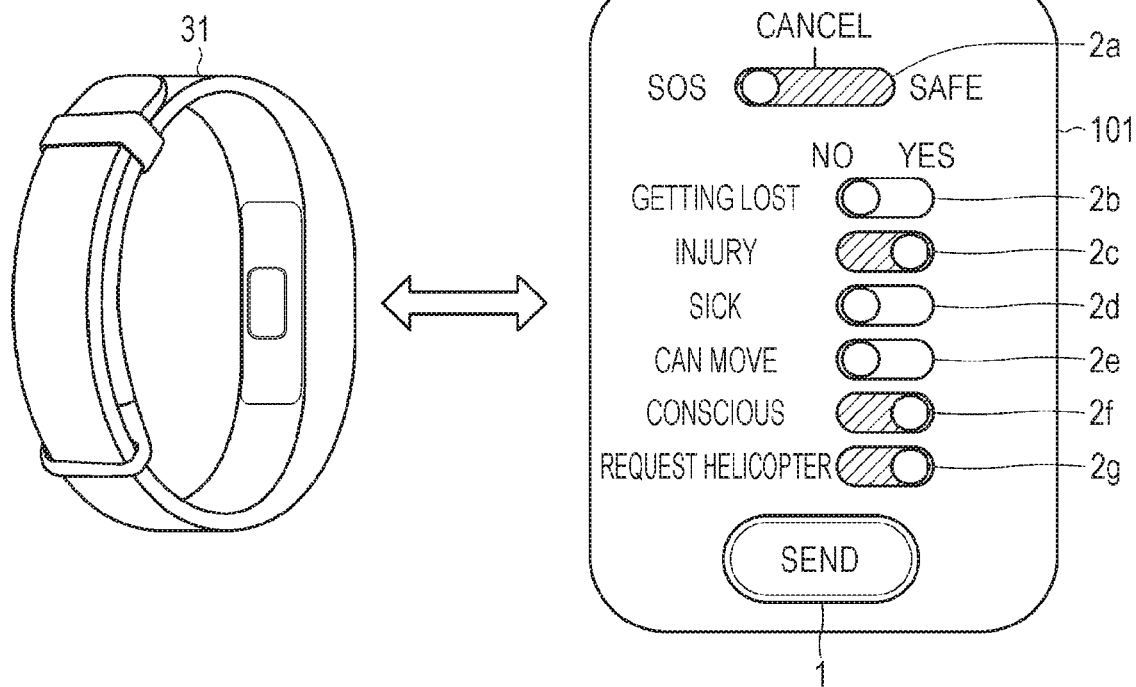
FIGS. 12A and 12B are schematic line diagrams used to explain spoofing prevention and malfunction prevention using a wristband type device.

A third method is providing a wearable device with a function of a malfunction prevention tag. As illustrated in FIG. 12A, a wearable device, for example, the wristband type device 31 and the wireless terminal 101 are connected by the BT. When it is determined that the distance between the wristband type device 31 and the wireless terminal 101 is equal to or less than a predetermined distance, a rescue request is sent when the send button 1 of the wireless terminal 101 is pressed. In a case where the distance is longer than a predetermined distance, a rescue request is not sent even if the send button 1 is pressed.

Figure 12B:
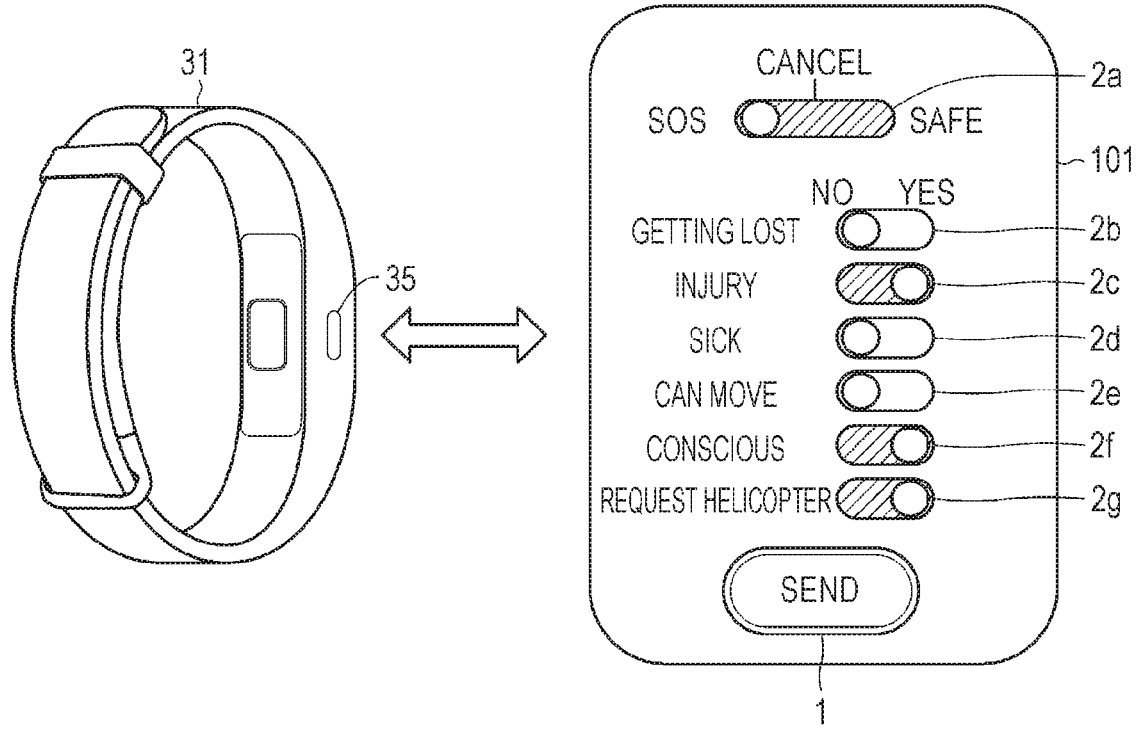

As illustrated in FIG. 12B, a rescue request button 35 is provided for the wristband type device 31. Only when the rescue request button 35 is pressed, the send button 1 on the wireless terminal 101 becomes valid. The wearable device 31 and the wireless terminal 101 are connected, for example, by the BT.

Figure 13:
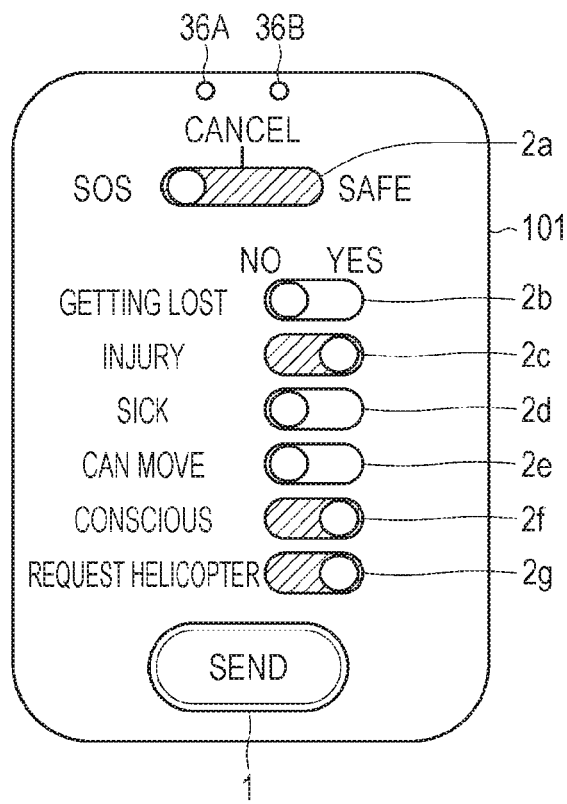
FIG. 13 is a schematic line diagram used to explain a case where spoofing prevention and malfunction prevention are performed by an authentication function such as face authentication.

A fourth method is adding a function of biometric authentication (fingerprint authentication, face authentication, or the like) to the wireless terminal 101, and transmitting a rescue request if authentication can be made. For example, as illustrated in FIG. 13, sensors 36A and 36B are provided for the wireless terminal 101. Moreover, a fingerprint authentication function may be added to the send button 1.

Figure 14:
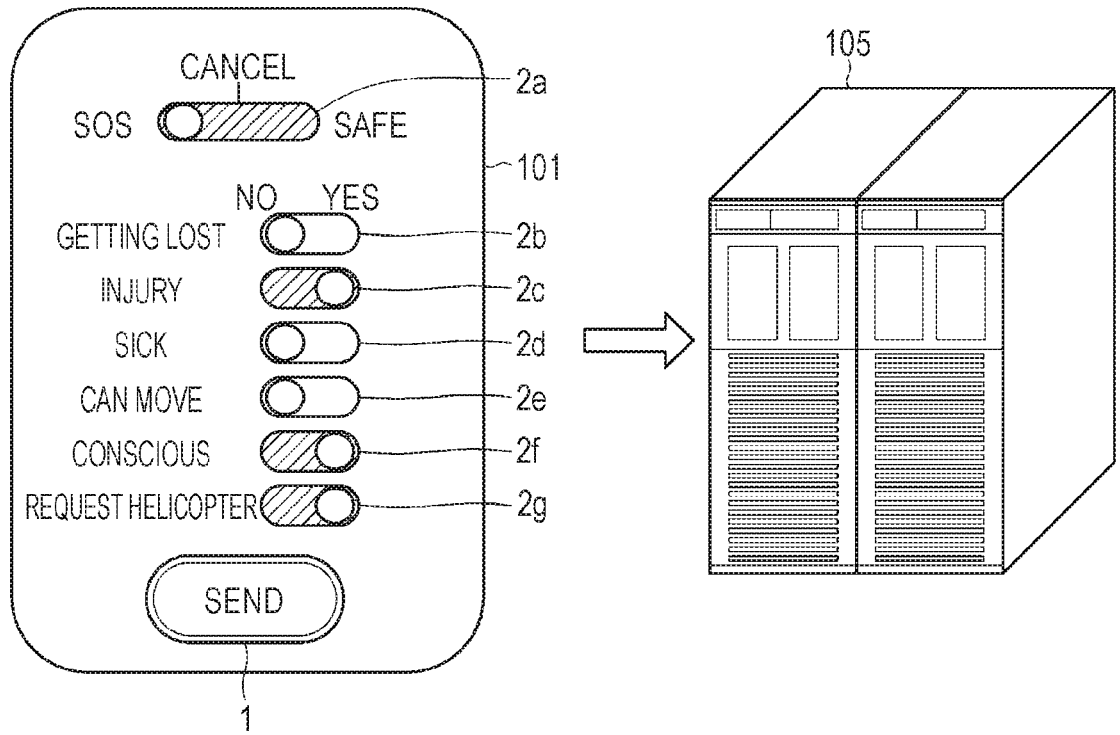
FIG. 14 is a schematic line diagram used to explain a case where spoofing prevention and malfunction prevention are performed by a location lock function.

A fifth method is providing a location lock function. As illustrated in FIG. 14, in a case where a rescue request notification is sent from the wireless terminal 101 to the server 105, a rescue request sent at a place that is obviously not a place where an accident occurs from the position information included in the rescue request notification is treated as misinformation.

Figure 15:
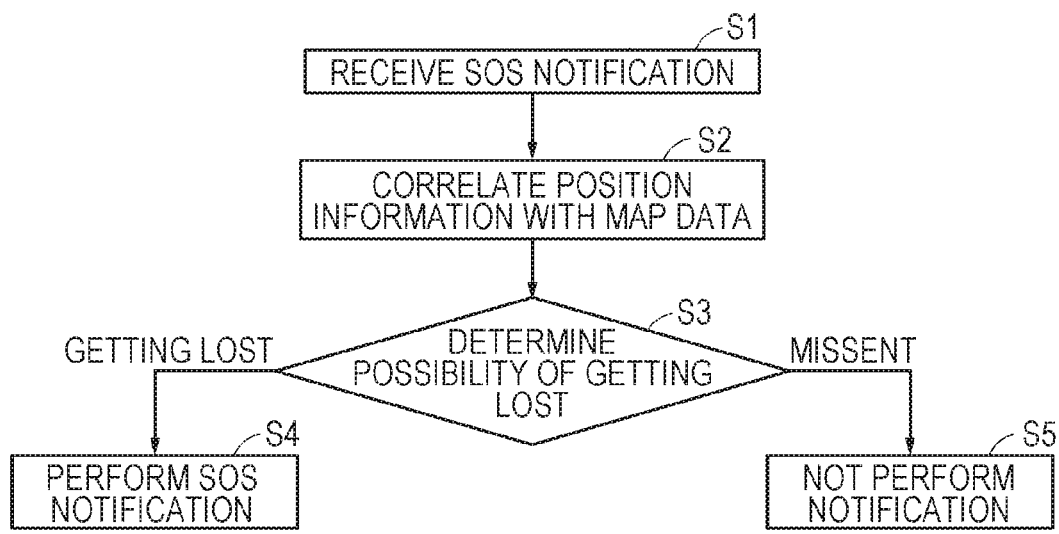
FIG. 15 is a flowchart used to explain a determination as to whether or not to treat as a false report.

The server 105 determines whether or not to treat as misinformation. FIG. 15 illustrates an example of processing of the server 105. When the rescue request notification is received in step S1, the position information included in the rescue request notification and the map data are collated with each other (step S2), and the possibility of an accident is determined (step S3). If it is determined that the possibility of an accident is high, notification is made to the registrant, the rescue agency, and the like (step S4). In a case where it is determined that it is missent, no notification is made to the registrant, the rescue agency, and the like (step S5). Otherwise, notification is made to the registrant such as a family member, of the possibility of misinformation.

A sixth method is unlocking by specific button operation. For example, only in a case of a rescue request, it is necessary to press the send button 1 twice. When it is pressed once, it enters a standby state, and when it is pressed again within a predetermined time, a rescue request is sent. Furthermore, the lock may be released and the send button 1 may be enabled when predetermined button operation is performed.

Figure 16:
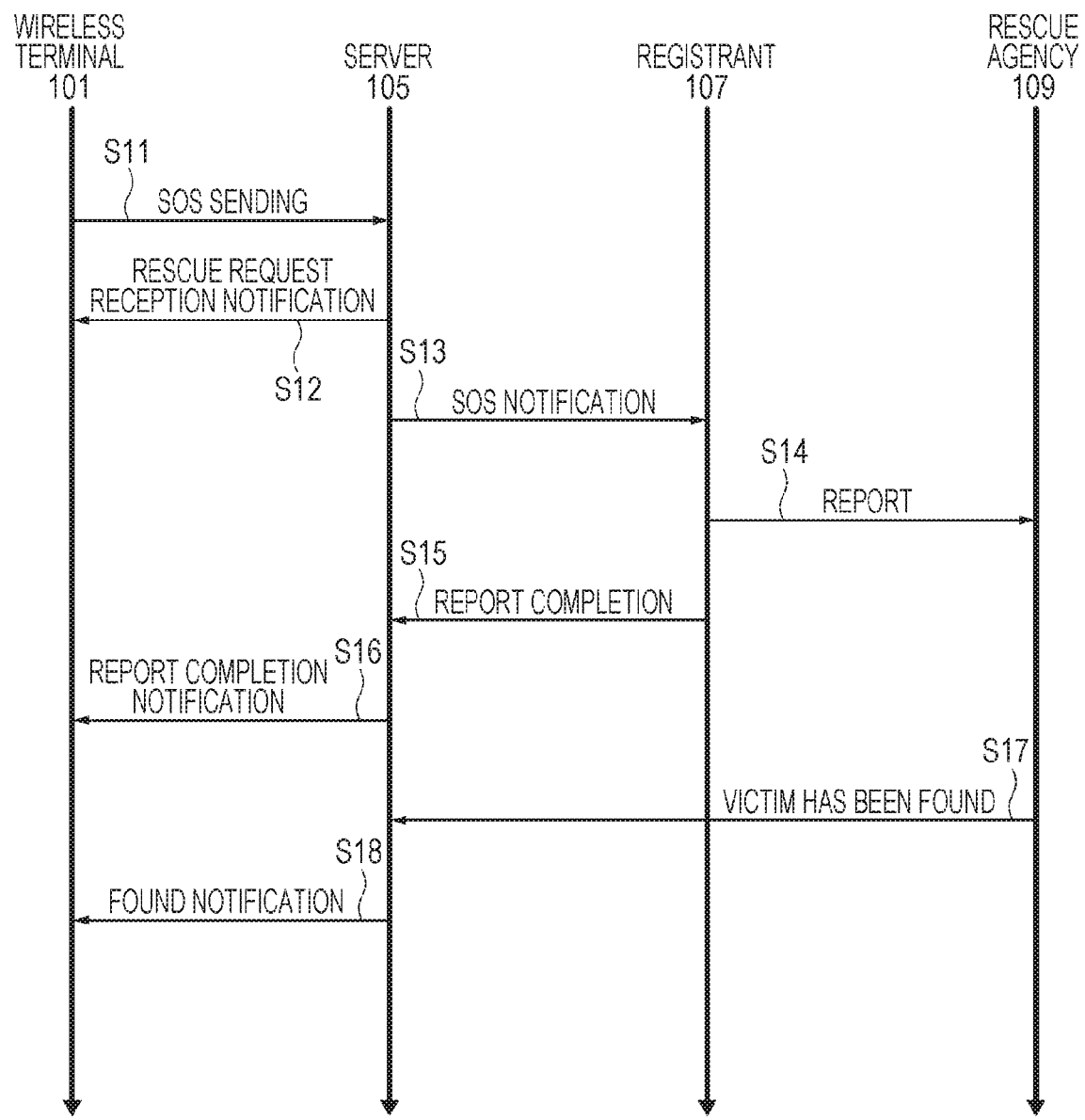
FIG. 16 is a flowchart used to explain processing in a case where bidirectional communication is enabled.

The above description is an example in which communication from the wireless terminal 101 to the server 105 is unidirectional communication. However, bidirectional communication may be possible. For example, as illustrated in the flowchart of FIG. 16, the victim can be notified of the search situation. As a result, anxiety can be reduced by making notification of the search situation. Furthermore, the status of the search is indicated by LED color or blinking.

Each step of FIG. 16 will be described.

Step S11: The rescue request sent from the victim (wireless terminal 101) is received by the server 105.

Step S12: The victim is notified of reception of the rescue request.

Step S13: The server 105 notifies a registrant such as a family member.

Step S14: The registrant 107 notifies the rescue agency 109.

Step S15: The registrant 107 notifies the server 105 that the report has been completed.

Step S16: The server 105 sends a notification completion notice to the victim.

Step S17: The rescue agency 109 notifies the server 105 that the victim has been found.

Step S18: The server 105 notifies the victim of the finding.

Figure 17:
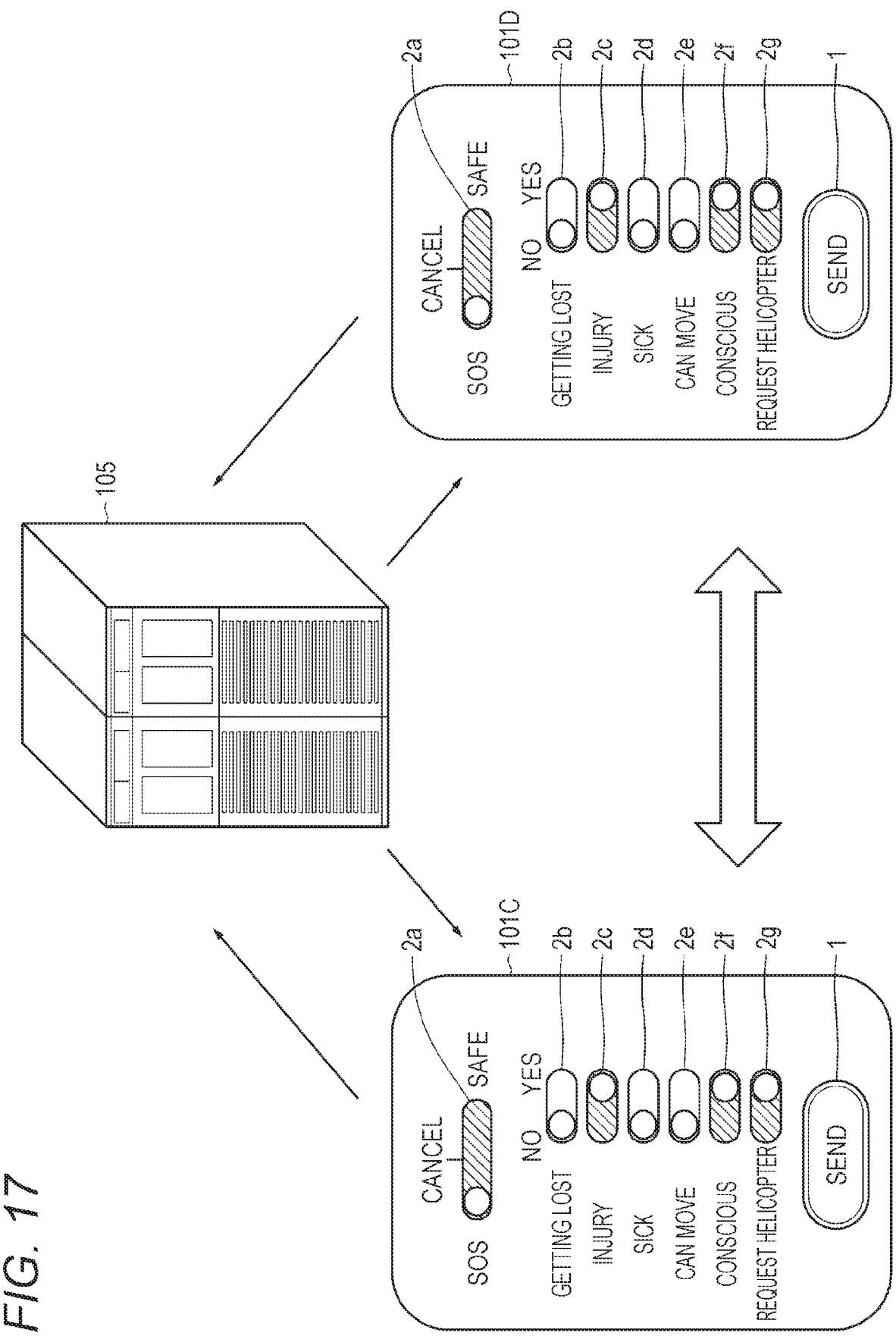
FIG. 17 is a flowchart used to explain rescue processing in a case where bidirectional communication is enabled.

Bidirectional communication can be used to notify the victim that a rescue team is approaching. As illustrated in FIG. 17, the rescue team carries a wireless terminal 101D separately from a victim's wireless terminal 101C. The wireless terminals 101C and 101D transmit data including position information to the server 105. The server 105 determines a positional relationship (the distance L between the two) from the received position information of the victim and the position information of the rescue team. When the distance L is shorter than a predetermined distance, the wireless terminals 101C and 101D are notified that the distance is short. In the wireless terminals 101C and 101D that have received the notification, notification is made that the distance is short by turning on an LED, a buzzer, or vibration.

The victim may be notified of danger using bidirectional communication. A warning is issued from the server 105 on the basis of the position information of the climber. For example, warning is issued at the time of arrival at a place where an accident often occurs or where getting lost often occurs. Furthermore, at the time of walking on a route other than the preset route, a warning is issued. Moreover, warning is issued when it is taking too long time. It is possible to prevent the inability to descend by sunset.

A message function may be provided using bidirectional communication. When the wireless terminal 101 receives a message from the server 105, the received message is displayed on a display unit attached to the wireless terminal 101. In a case of the LPWA, a short sentence or a fixed sentence is sent because the amount of data is small. The fixed sentence is a message of search situation and encouragement. The transmission from the wireless terminal 101 is made to send a short sentence or a fixed sentence. Moreover, a sentence is created by a smartphone, data is sent from the smartphone to the wireless terminal 101 through the BT connection, and the data is transmitted from the wireless terminal 101.

<2. Modification>

As described above, an embodiment of the present technology has been specifically described. However, the present technology is not limited to the above-described embodiment, and various modifications based on the technical idea of the present technology are possible. Furthermore, the configurations, methods, steps, shapes, materials, numerical values, and the like described in the above embodiments are merely examples, and if necessary, different configurations, methods, steps, shapes, materials, numerical values, and the like may be used. For example, the present technology can be applied to a rescue request system in an area where a mobile phone is not accessible such as an accident at sea, in addition to an accident during mountain climbing.

Note that, the present technology can adopt the following configuration.

(1)

A portable wireless device including a wireless communication unit, a position information acquisition unit, an operation unit, and a control unit, in which a rescue request and state information are generated by operation of the operation unit, and the generated information is transmitted from the wireless communication unit together with position information acquired by the position acquisition unit.

(2)

The portable wireless device according to (1), in which cancel information or safe information is generated by operation of the operation unit.

(3)

The portable wireless device according to (1) or (2), in which the position information and the state information are transmitted every predetermined time.

(4)

The portable wireless device according to any one of (1) to (3), in which the wireless communication unit includes a reception unit that performs bidirectional communication.

(5)

The portable wireless device according to any one of (1) to (4), in which the wireless communication unit performs communication using an LPWA method.

(6)

The portable wireless device according to any one of (1) to (5), further including another wireless communication unit for connection to another device.

(7)

The portable wireless device according to (6), in which the another device is a wearable device, and communication is performed with the wearable device through the another wireless communication unit, and the state information includes biological information acquired by the wearable device.

(8)

The portable wireless device according to (6), in which the another device is a tag or a wearable device, and communication is performed with the tag through the another wireless communication unit to prevent spoofing or malfunction.

(9)

The portable wireless device according to any one of (1) to (6), further including a biometric authentication function, in which the biometric authentication function prevents spoofing or malfunction.

(10)

A communication method including generating a rescue request and state information by operation of an operation unit, and transmitting generated information together with position information from a wireless communication unit.

(11)

A server that manages registration information of a plurality of portable wireless devices, and holds state information and position information received for each portable wireless device in time series.

(12)

The server according to (11) that contacts a registrant in a case where a rescue request is received from the portable wireless device.

(13)

The server according to (11) that contacts an insurance company or a rescue agency in a case where a rescue request is received from the portable wireless device.

REFERENCE SIGNS LIST

1 Send button
2, 2a to 2g Operation switch
11 LPWA module
15 GNSS reception unit
23 MPU
31 Wristband type device
32 Malfunction prevention tag
101 Wireless terminal
103 Gateway
105 Server
107 Registrant
109 Rescue agency
111 Insurance company

The invention claimed is:

1. A portable wireless device, comprising:
a first wireless communication unit;
a second wireless communication unit configured to connect to a device different from the portable wireless device; and
circuitry configured to:
  acquire position information of the portable wireless device;
  generate a rescue request and state information based on a status of the portable wireless device,
    wherein the status of the portable wireless device indicates a current situation of a user associated with the portable wireless device;
  determine a distance between the portable wireless device and the device is equal to or less than a specific distance; and
  control the first wireless communication unit to transmit the rescue request, the state information, and the position information,
    wherein the transmission of the rescue request, the state information, and the position information is based on the determination the distance between the portable wireless device and the device is equal to or less than the specific distance.

2. The portable wireless device according to claim 1, wherein the circuitry is further configured to generate at least one of cancel information or safe information.

3. The portable wireless device according to claim 1, wherein the circuitry is further configured to periodically transmit the position information and the state information at a specific time.

4. The portable wireless device according to claim 1, wherein the first wireless communication unit includes a reception unit that is configured to perform bidirectional communication.

5. The portable wireless device according to claim 1, wherein the first wireless communication unit is configured to perform communication based on a Low Power Wide Area (LPWA) method.

6. The portable wireless device according to claim 1, wherein
the device is a wearable device,
the circuitry is further configured to perform communication with the wearable device through the second wireless communication unit, and
the state information includes biological information acquired by the wearable device.

7. The portable wireless device according to claim 1, wherein
the device is a tag or a wearable device, and
the circuitry is further configured to perform communication with the tag through the second wireless communication unit to prevent spoofing or malfunction.

8. The portable wireless device according to claim 1, further comprising a biometric authentication function to prevent spoofing or malfunction.

9. A communication method, comprising:
acquiring position information of a portable wireless device;
generating a rescue request and state information based on a status of the portable wireless device,
wherein the status of the portable wireless device indicates a current situation of a user associated with the portable wireless device;
determining a distance between the portable wireless device and a device different from the portable wireless device is equal to or less than a specific distance; and
transmitting the rescue request, the state information, and the position information based on the determination the distance between the portable wireless device and the device is equal to or less than the specific distance.

10. A server, comprising:
circuitry configured to:
manage registration information of a plurality of portable wireless devices;
receive a rescue request, state information, and position information of a portable wireless device of the plurality of portable wireless devices based on
a determination, by the portable wireless device, that a distance between the portable wireless device and a device different from the portable wireless device is equal to or less than a specific distance, and
a status of the portable wireless device of the plurality of portable wireless devices,
wherein the status indicates a current situation of a user associated with the portable wireless device of the plurality of portable wireless devices; and
hold the state information and the position information for the portable wireless device of the plurality of portable wireless devices in time series.

11. The server according to claim 10, wherein
the circuitry is further configured to contact a registrant based on the rescue request, and
the registrant is associated with the user.

12. The server according to claim 10, wherein the circuitry is further configured to contact an insurance company or a rescue agency based on the rescue request.

* * * * *